United States Patent
Shen et al.

(10) Patent No.: US 11,575,539 B2
(45) Date of Patent: Feb. 7, 2023

(54) IDENTIFICATION NUMBER NUMBERING METHOD AND MULTIPOINT COMMUNICATION SYSTEM

(71) Applicant: E Ink Holdings Inc., Hsinchu (TW)

(72) Inventors: Yi-Jhou Shen, Hsinchu (TW); Zhone-Yang Wu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 123 days.

(21) Appl. No.: 16/920,360

(22) Filed: Jul. 2, 2020

(65) Prior Publication Data

US 2021/0006429 A1    Jan. 7, 2021

(30) Foreign Application Priority Data

Jul. 4, 2019   (TW) ................. 108123595

(51) Int. Cl.
*H04L 12/403* (2006.01)
*G06F 13/40* (2006.01)
*H04L 12/40* (2006.01)

(52) U.S. Cl.
CPC ........ *H04L 12/403* (2013.01); *G06F 13/4068* (2013.01); *H04L 12/40019* (2013.01)

(58) Field of Classification Search
CPC ............. G06F 13/3625; G06F 13/4291; G06F 13/4068; H04L 12/403
See application file for complete search history.

(56) References Cited

U.S. PATENT DOCUMENTS

| | | | |
|---|---|---|---|
| 6,189,059 B1 | 2/2001 | Sotek et al. | |
| 6,209,022 B1 | 3/2001 | Sotek et al. | |
| 8,285,905 B2 | 10/2012 | Hikabe | |
| 9,684,624 B2 | 6/2017 | Sengoku | |
| 2003/0023797 A1 | 1/2003 | Chien et al. | |
| 2004/0010728 A1* | 1/2004 | Musumeci | H03K 5/1252 713/400 |
| 2007/0201346 A1* | 8/2007 | Geile | H04N 21/2383 370/203 |
| 2020/0167301 A1* | 5/2020 | Matsumoto | G06F 13/4291 |

FOREIGN PATENT DOCUMENTS

| | | |
|---|---|---|
| CN | 108270883 | 7/2018 |
| CN | 108369565 | 8/2018 |
| CN | 109240971 | 1/2019 |

* cited by examiner

*Primary Examiner* — Mahran Y Abu Roumi
(74) *Attorney, Agent, or Firm* — JCIPRNET (57) ABSTRACT

The present invention discloses an identification number numbering method and a multipoint communication system. The identification number numbering method includes the following steps: sending an identification number packet to a multipoint communication bus by a master device; receiving the identification number packet via the multipoint communication bus, and temporarily storing an identification number according to the identification number packet by a first slave device; changing a voltage level of a master device control output pin of the master device; and when the first slave device determines that a voltage level of a first control input pin coupled to the master device control output pin is correspondingly changed, updating a first slave device identification number of the first slave device according to the identification number.

6 Claims, 6 Drawing Sheets

IDENTIFICATION NUMBER NUMBERING METHOD AND MULTIPOINT COMMUNICATION SYSTEM

CROSS-REFERENCE TO RELATED APPLICATION

This application claims the priority benefit of Taiwan application serial no. 108123595, filed on Jul. 4, 2019. The entirety of the above-mentioned patent application is hereby incorporated by reference herein and made a part of this specification.

BACKGROUND OF THE INVENTION

1. Field of the Invention

The present invention generally relates to a coding method, in particular, to an identification number numbering method and a multipoint communication system.

2. Description of Related Art

A data transmission manner for multiple terminal devices in a general industrial system or multi-device system is usually to connect the multiple terminal devices by use of a communication bus to enable the multiple terminal devices to perform communication or data exchange. In such case, the multiple terminal devices may have different identification numbers as device identification bases among the multiple terminal devices in a process of connecting the multiple terminal devices by use of the communication bus for communication or data exchange. However, a general identification number numbering manner for the multiple terminal devices is to adopt manually set numbers (for example, plug-in dip switch) or use fixed identification numbers for the multiple terminal devices respectively for distinction. Therefore, a conventional identification number numbering manner for multiple devices usually requires relatively high time cost, is lack of setting flexibility and even increases system setting cost. In view of this, solutions of a few embodiments will be disclosed below.

SUMMARY OF THE INVENTION

The present invention provides an identification number numbering method and a multipoint communication system. Identification numbers of multiple devices in the multipoint communication system may be automatically numbered.

An identification number numbering method for a multipoint communication system of the present invention includes the following steps: sending an identification number packet by a master device to a multipoint communication bus receiving the identification number packet via the multipoint communication bus by a first slave device, and temporarily storing an identification number by the first slave device according to the identification number packet; changing a voltage level of a master device control output pin of the master device; and when the first slave device determines that a voltage level of a first control input pin coupled to the master device control output pin is correspondingly changed, updating a first slave device identification number of the first slave device by the first slave device according to the identification number.

A multipoint communication system of the present invention includes a master device and a first slave device. The master device is coupled to a multipoint communication bus. The master device includes a master device control output pin. The first slave device is coupled to the multipoint communication bus. The first slave device includes a first control input pin. The master device control output pin of the master device is coupled to the first control input pin of the first slave device. When the master device executes an identification number numbering operation, the master device changes a voltage level of the master device control output pin, such that when the first slave device determines that a voltage level of the first control input pin is correspondingly changed, the first slave device updates a first slave device identification number of the first slave device.

Based on the above, the identification number numbering method and the multipoint communication system of the present invention can transmit the identification number packet to the multipoint communication bus by the master device, such that the first slave device can automatically update the first slave device identification number after receiving the identification number packet.

In order to make the aforementioned features and advantages of the present invention more comprehensible, embodiments accompanied with accompanying drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
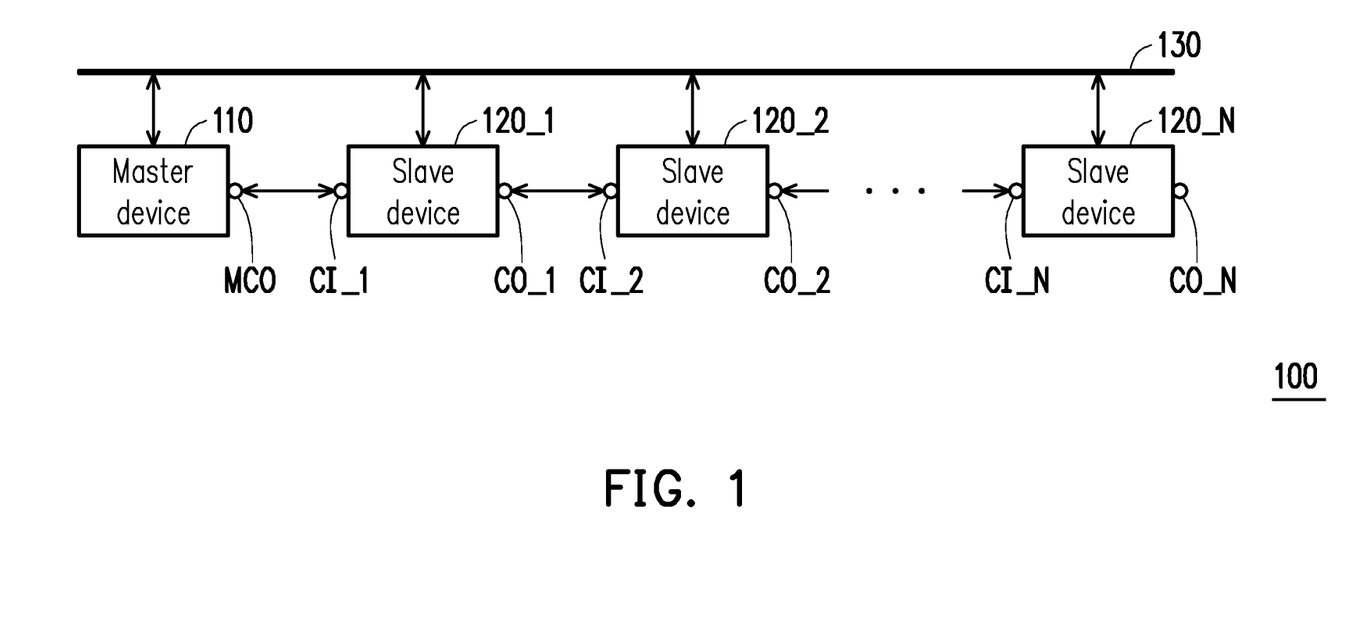
FIG. 1 is a schematic block diagram of a multipoint communication system according to an embodiment of the present invention.

FIG. 1 is a schematic block diagram of a multipoint communication system according to an embodiment of the present invention. Referring to FIG. 1, the multipoint communication system 100 includes a master device 110, multiple slave devices 120_1-120_N and a multipoint communication bus 130. N is a positive integer greater than 0. The master device 110 and the multiple slave devices 120_1-120_N are coupled to the multipoint communication bus 130 for communication and data exchange via the multipoint communication bus 130 respectively. In the present embodiment, the multipoint communication system 100 adopts an RS485 serial communication protocol, but the present invention is not limited thereto. In an embodiment, the multipoint communication system 100 may also adopt another type of serial communication protocol capable of implementing the present invention. In addition, in the present embodiment, the master device 110 and the multiple slave devices 120_1-120_N may be the same or different terminal devices. Moreover, the master device 110 and the multiple slave devices 120_1-120_N are interconnected via the multipoint communication bus 130 to form a specific system architecture.

In the present embodiment, each of the master device 110 and the multiple slave devices 120_1-120_N may include a Microprogrammed Control Unit (MCU) and a Memory Unit (MU), and at least has a multipoint communication bus processing function and a General Purpose Input/Output (GPIO) signal processing function. In the present embodiment, each of the master device 110 and the multiple slave devices 120_1-120_N may be coupled to the multipoint communication bus 130, and takes two GPIO pins of the respective MCU as a control input pin and a control output pin respectively.

Specifically, a master device control output pin MCO of the master device 110 is coupled to the control input pin CI_1 of the slave device 120_1, and the control output pin CO_1 of the slave device 120_1 is coupled to the control input pin CI_2 of the slave device 120_2. By parity of reasoning, the master device 110 and the multiple slave devices 120_1-120_N are coupled in series via the control input pins CI_1-CI_N and the control output pins CO_1-CO_N. In the present embodiment, the control input pins CI_1-CI_N and the control output pins CO_1-CO_N are used for identification number numbering control. In addition, the master device 110 may also include a control input pin (not shown in the figure), which will not be limited in the present invention. Moreover, in an embodiment, the master device 110 and the multiple slave devices 120_1-120_N may be multiple terminal devices of the same type. In other words, a user may freely select the master device 110 from the multiple terminal devices, and the other terminal devices may serve as the multiple slave devices 120_1-120_N.

Furthermore, when the user couples the master device 110 and the multiple slave devices 120_1-120_N to the multipoint communication bus 130, the user may operate the master device 110 to link the master device 110 and the multiple slave devices 120_1-120_N to automatically execute an identification number numbering operation. During the identification number numbering operation, the master device 110 may send an identification number packet to the multipoint communication bus 130 to enable each of the slave devices 120_1-120_N to receive the identification number packet via the multipoint communication bus 130 and temporarily store an identification number according to the identification number packet. Then, the master device 110 changes a voltage level of the master device control output pin MCO to correspondingly change a voltage level of the control input pin CI_1 of the slave device 120_1 coupled to the master device control output pin MCO. When the slave device 120_1 determines that the voltage level of the control input pin CI_1 is correspondingly changed, the slave device 120_1 is triggered to read the identification number temporarily stored last time and update a slave device identification number of the slave device 120_1 (for example, updated to ID1) according to the temporarily stored identification number. It is to be noted that, the master device 110 may also be preset with a device identification number which may be, for example, a previous number (for example, ID0) of the updated slave device identification number.

Then, after the slave device 120_1 completes updating the slave device identification number of the slave device 120_1, the slave device 120_1 may send a confirmation packet to the multipoint communication bus 130 to enable the master device 110 to determine that the multiple slave devices 120_1-120_N are still being numbered. Moreover, the slave device 120_1 further sends another identification number packet (i.e., the confirmation packet) to the multipoint communication bus 130 to enable the master device 110 and the slave devices 120_2-120_N to receive the another identification number packet. Each of the slave devices 120_2-120_N temporarily stores another identification number according to the another identification number packet, but the master device 110 may not execute a related operation according to the another identification number packet. Then, the master device 120_1 changes a voltage level of the control output pin CO_1 to correspondingly change a voltage level of the control input pin CI_2 of the slave device 120_2 coupled to the control output pin CO_1 of the slave device 120_1. When the slave device 120_2 determines that the voltage level of the control input pin CI_2 is correspondingly changed, the slave device 120_2 is triggered to read the another identification number that is temporarily stored and update a slave device identification number of the slave device 120_2 according to the another identification number that is temporarily stored. It is to be noted that, the another slave device identification number may be, for example, a next number of the updated slave device identification number (for example, updated to ID2) and a content of the confirmation packet is a next identification number packet. By parity of reasoning, the slave devices 120_1-120_N of the multipoint communication system 100 of the present embodiment may automatically execute identification number numbering in sequence.

Moreover, after the slave device 120_2 completes updating the slave device identification number of the slave device 120_2, the slave device 120_2 may also send a confirmation packet to the multipoint communication bus 130 to enable the master device 110 to determine that the multiple slave devices 120_1-120_N are still being numbered. However, if the slave device 120_2 is the last terminal device, the master device 110 may not receive a next confirmation packet after the master device 110 receives the confirmation packet sent by the slave device 120_2. Therefore, in the present embodiment, the master device 110, after receiving the confirmation packet, may perform timing to determine whether a confirmation packet is received in a preset time interval. If continuing receiving the confirmation packet, the master device 110 determines that the multiple slave devices 120_1-120_N are still performing identification number numbering, and restarts timing. If NO, the master device 110 determines that identification number numbering of the multiple slave devices 120_1-120_N has been completed. The master device 110 may reset the voltage level of the master device control output pin MCO and send (broadcast) a coding stopping packet to the multipoint communication bus 130, so that the multiple slave devices 120_1-120_N resets the control input pins CI_1-CI_N for next numbering. That is, during the identification number numbering operation, the master device 110 may effectively monitor a numbering progress of the multiple slave devices 120_1-120_N to determine whether to end the identification number numbering operation.

Figure 2:
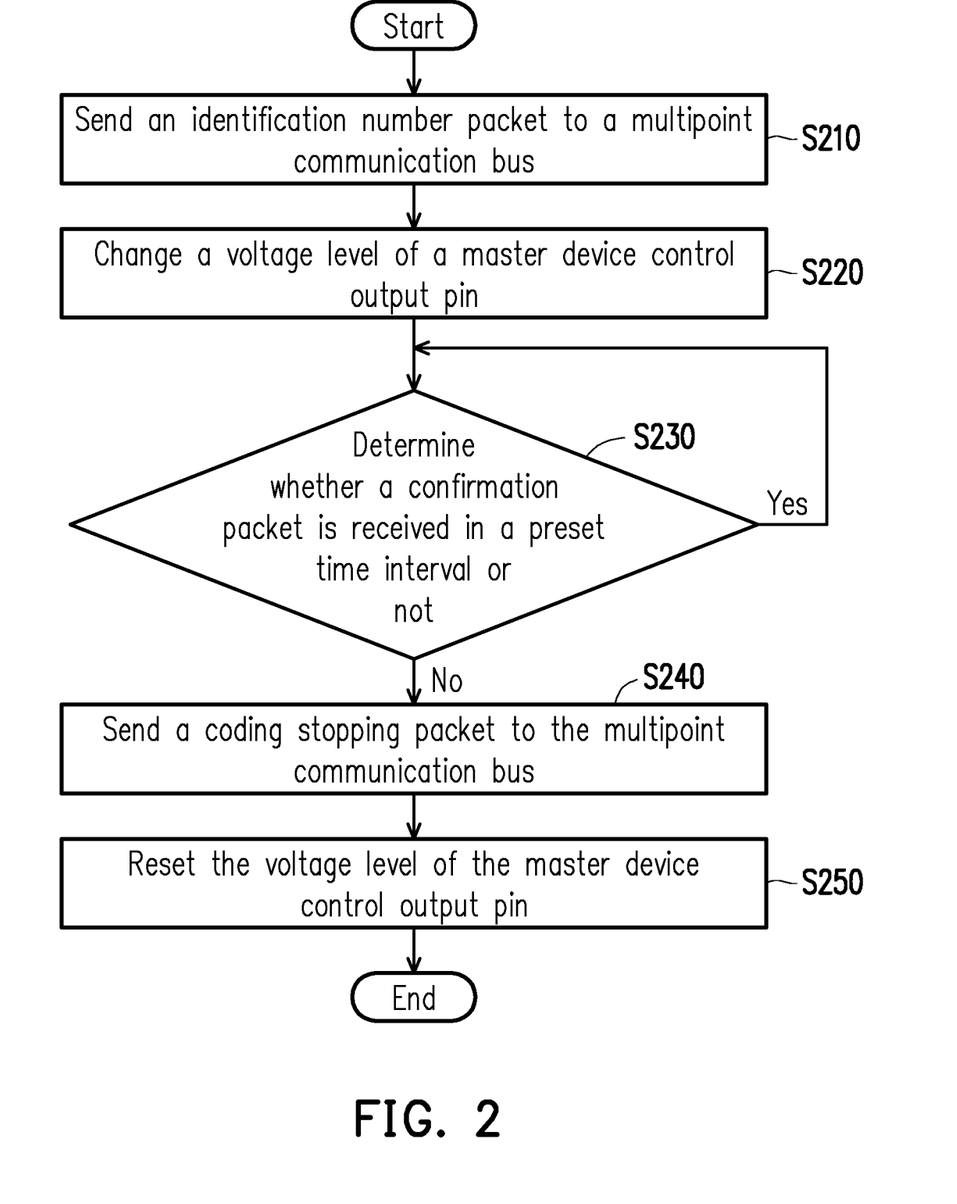
FIG. 2 is an operating flowchart of a master device according to an embodiment of the present invention.

FIG. 2 is an operating flowchart of a master device according to an embodiment of the present invention. Referring to FIG. 1 and FIG. 2, the master device 110 may execute the steps S210-S250 to implement the identification number numbering operation in each embodiment of the present invention. In step S210, the master device 110 sends an identification number packet to a multipoint communication bus 130. In step S220, the master device 110 changes a voltage level of a master device control output pin MCO. In step S230, the master device 110 determines whether a confirmation packet is received in a preset time interval. If YES, it is indicated that the identification number numbering operation of slave devices 120_1-120_N is still in progress. In such case, the master device 110 has received the confirmation packet (the specific one the of slave devices 120_1-120_N that provides the confirmation packet is not limited), and thus the master device 110 re-executes the step S230. If NO, it is indicated that the identification number numbering operation of the slave devices 120_1-120_N has been ended. In such case, the master device 110 does not receive any confirmation packet, and thus the master device 110 executes the step S240. In an embodiment, the preset time interval may be, for example, 1 second, but the present invention is not limited thereto.

In step S240, the master device 110 sends a coding stopping packet to the multipoint communication bus 130, so that the slave devices 120_1-120_N stops the identification number numbering operation after the slave devices 120_1-120_N respectively receives the coding stopping packet. In step S250, the master device 110 resets the voltage level of the master device control output pin MCO.

Figure 3:
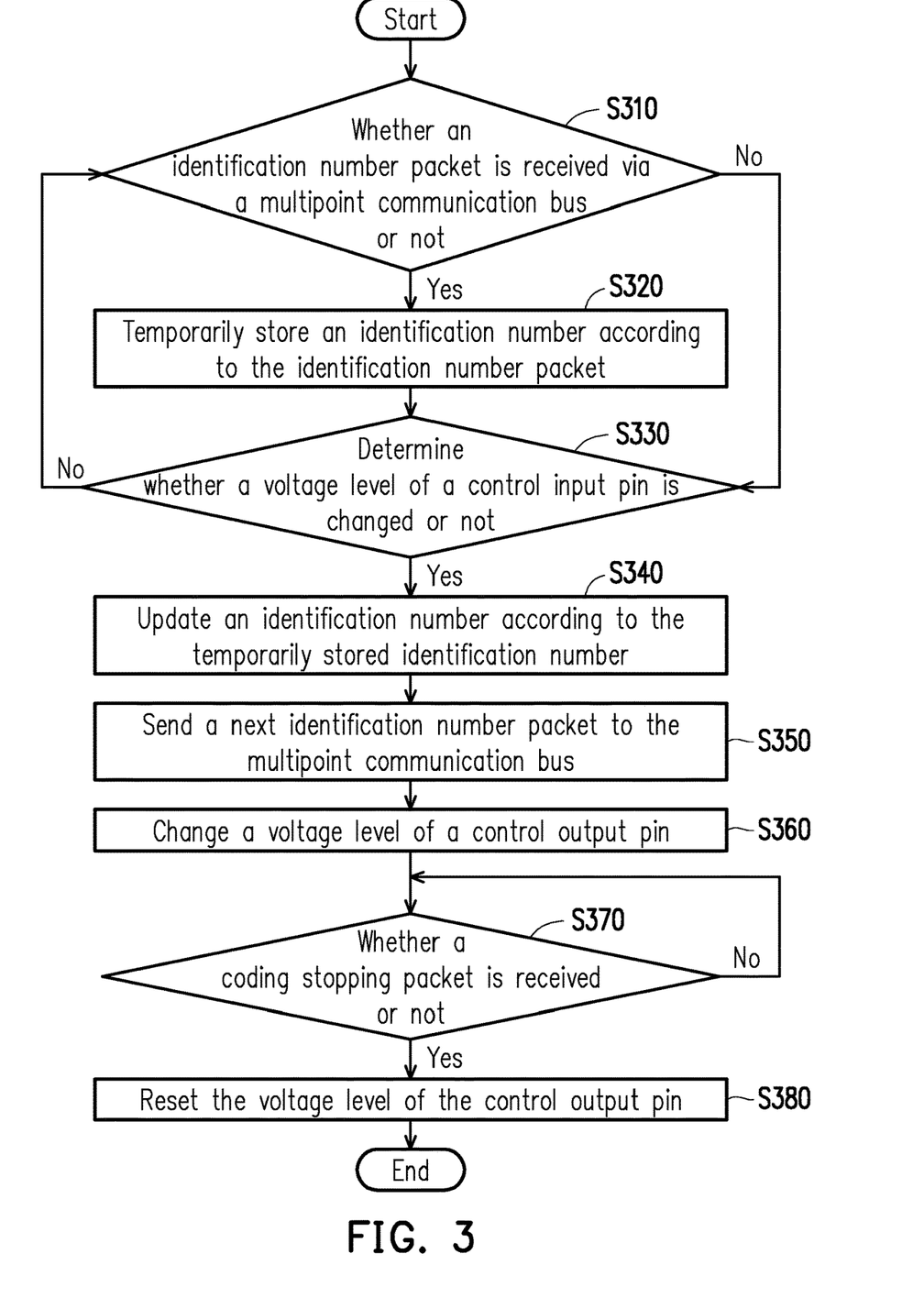
FIG. 3 is an operating flowchart of a slave device according to an embodiment of the present invention.

FIG. 3 is an operating flowchart of a slave device according to an embodiment of the present invention. Referring to FIG. 1 and FIG. 3, slave devices 120_1-120_N may execute the steps S310-S380 to implement the identification number numbering operation in each embodiment of the present invention respectively. Descriptions will be made below with the slave device 120_2 as an example, and are applied by analogy to the another slave devices. In step S310, the slave device 120_2 determines whether to receive an identification number packet via a multipoint communication bus 130. If NO, it is indicated that a master device 110 or the slave device 120_1 has yet not sent any identification number packet, and thus the slave device 120_2 executes the step S330. If YES, it is indicated that the master device 110 or the slave device 120_1 has sent the identification number packet, and thus the slave device 120_2 executes the step S320. In step S320, the slave device 120_2 temporarily stores an identification number according to the identification number packet, and then executes the step S330.

In step S330, the slave device 120_2 determines whether a voltage level of a control input pin CI_2 is changed. If the voltage level of the control input pin CI_2 is not changed, it is indicated that the previous slave device 120_1 has yet not updated a slave device identification number, and thus the slave device 120_2 re-executes the step S310. Moreover, after the previous slave device 120_1 completes updating the slave device identification number of the previous slave device 120_1, in step S320, the slave device 120_2 may duplicate an identification number temporarily stored last time according to a new identification number in the identification number packet provided by the previous slave device 120_1. On the contrary, if the voltage level of the control input pin CI_2 is changed, it is indicated that the previous slave device 120_1 has updated the slave device identification number before, and thus the slave device 120_2 executes the step S340.

In step S340, the slave device 120_2 updates the slave device identification number of the slave device 120_2 according to the temporarily stored identification number. In step S350, the slave device 120_2 sends a next identification number packet (i.e., a confirmation packet) to the multipoint communication bus 130 to enable the master device 110 and the another slave devices to receive the next identification number packet. In step S360, the slave device 120_2 changes a voltage level of a control output pin CO_2. However, it is to be noted that, a sequence of S340 to S360 may be selectively changed and is not limited to FIG. 3.

In step S370, the slave device 120_2 determines whether to receive a coding stopping packet. If NO, it is indicated that the identification number numbering operation of the slave devices 120_1-120_N is still in progress, and the slave device 120_2 re-executes the step S370 to keep waiting. If YES, it is indicated that identification number numbering of the slave devices 120_1-120_N has been ended, and the slave device 120_2 executes the step S380. In step S380, the slave device 120_2 resets the voltage level of the control output pin CO_2, such that the slave device 120_2 is not required to reset the voltage level of the control output pin CO_2 during a next identification number numbering operation. By parity of reasoning, the another slave devices may also execute the steps S310-S380. Therefore, in combination with the operating flow, described in FIG. 2, of the master device, the slave devices 120_1-120_N of the multipoint system 100 of the embodiment shown in FIG. 1 may accurately and automatically execute identification number numbering in sequence.

Figure 4:
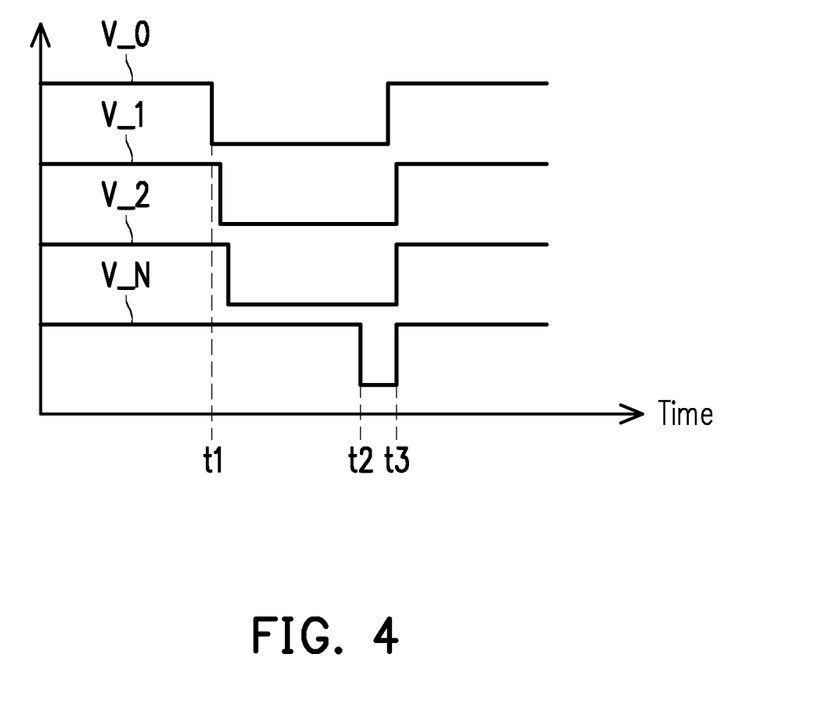
FIG. 4 is a changing sequence diagram of voltage levels of control output pins of a master device and multiple slave devices according to an embodiment of the present invention.

FIG. 4 is a changing sequence diagram of voltage levels of control output pins of a master device and multiple slave devices according to an embodiment of the present invention. Referring to FIG. 1 to FIG. 4, in an identification number numbering process of a multipoint communication system 100, changing of a voltage level V_0 of a master device control output pin MCO of a master device 110 and changing of voltage levels V_1-V_N of control output pins CO_1-CO_N of slave devices 120_1-120_N may be shown in FIG. 4. Specifically, the master device 110 executes, for example, an operating flow shown in FIG. 2. At time t1, the master device 110 executes the step S220 in FIG. 2 to change the voltage level V_0 of the master device control output pin MCO. In the present embodiment, the voltage level V_0 of the master device control output pin MCO may be changed from a high voltage level to a low voltage level, and a control input pin CI_1 of the slave device 120_1 is correspondingly changed to trigger the slave device 120_1 to update the slave device identification number of the slave device 120_1. Moreover, the slave device 120_1 executes, for example, an operating flow shown in FIG. 3. After the slave device 120_1 is triggered to execute updating of the slave device identification number, the slave device 120_1 executes the step S350 in FIG. 3 to change the voltage level V_1 of the control output pin CO_1 and send a confirmation packet to a multipoint communication bus 130. In the present embodiment, the voltage level V_1 of the control output pin CO_1 may be changed from a high voltage level to a low voltage level, and a control input pin CI_2 of the slave device 120_2 is correspondingly changed to trigger the slave device 120_2 to update the slave device identification number of the slave device 120_2.

By parity of reasoning, the voltage level V_2 of the slave device 120_2 is changed next until the voltage level V_N of the slave device 120_N is changed at time t2. In such case, since slave device identification numbers of all the slave devices 120_1-120_N have been updated, there is no more next slave device to be triggered to execute identification number numbering, and there is also no more confirmation packet to be sent to the multipoint communication bus 130. In the present embodiment, the master device 110 does not receive any confirmation packet in a preset time interval (for example, S230 in FIG. 2), and thus the master device 110 sends a coding stopping packet to the multipoint communication bus 130 and resets the voltage level V_0 of the master device control output pin MCO at time t3. Meanwhile, the slave devices 120_1-120_N determine that the coding stopping packet is received, and the slave devices 120_1-120_N reset the voltage levels V_0-V_N of the control output pins CO_1-CO_N of the slave devices 120_1-120_N respectively (for example, S370 and S380 in FIG. 3). Therefore, the voltage level V_0 of the master device control output pin MCO and the voltage levels V_0-V_N of the control output pins CO_1-CO_N are approximately reset from low voltage levels to high voltage levels at the time t3. It is to be noted that, a time interval between the time t2 and the time t3 is the preset time interval.

However, in the present invention, changing of the voltage level V_0 of the master device control output pin MCO and changing of the voltage levels V_1-V_N of the control output pins CO_1-CO_N of the slave devices 120_1-120_N are not limited to FIG. 4. In an embodiment, changing of the voltage level V_0 of the master device control output pin MCO and changing of the voltage levels V_1-V_N of the control output pins CO_1-CO_N of the slave devices 120_1-120_N may also refer to changing from low voltage levels to high voltage levels at first and then resetting from high voltage levels to low voltage levels.

Figure 5:
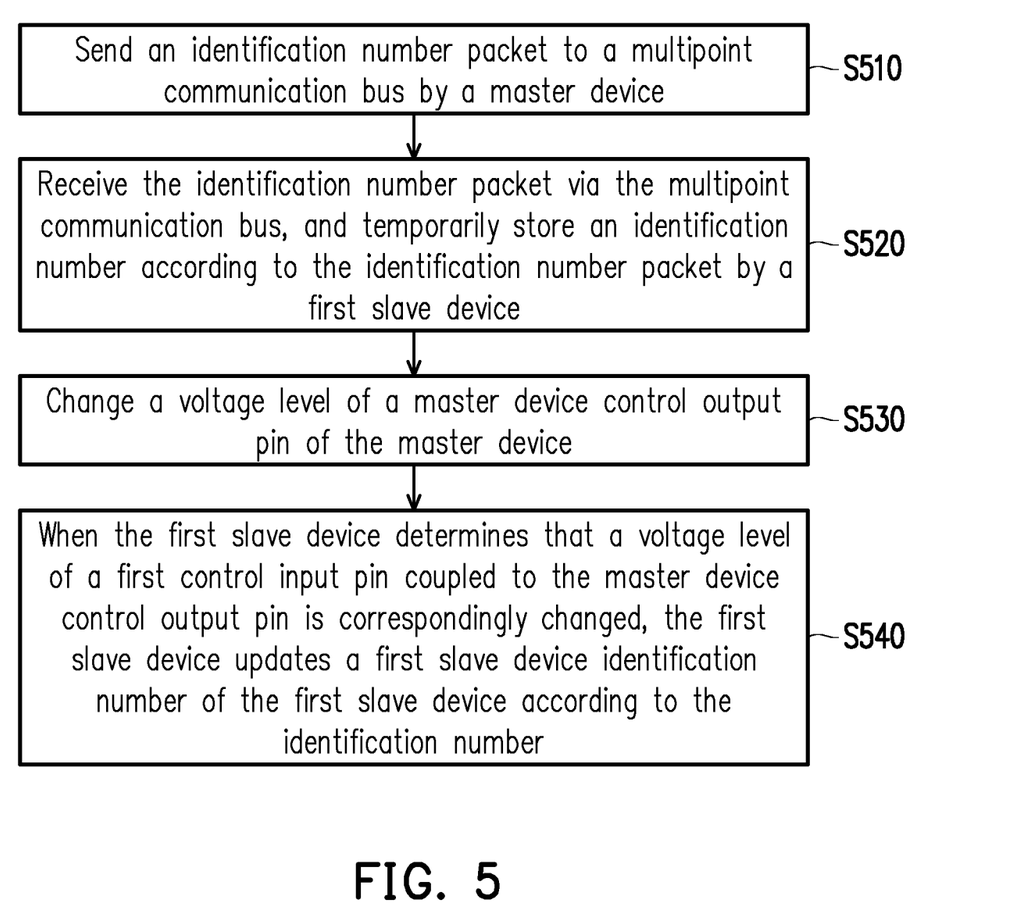
FIG. 5 is a flowchart of an identification number numbering method according to an embodiment of the present invention.

FIG. 5 is a flowchart of an identification number numbering method according to an embodiment of the present invention. Referring to FIG. 1 and FIG. 5, the identification number numbering method of the present embodiment may at least be applied to the multipoint communication system 100 in FIG. 1. In step S510, a master device 110 sends an identification number packet to a multipoint communication bus 130. In step S520, a first slave device 120_1 receives the identification number packet via the multipoint communication bus 130 and temporarily stores an identification number according to the identification number packet. In step S530, the master device 110 changes a voltage level of a master device control output pin MCO. In step S540, when the first slave device 120_1 determines that a voltage level of a first control input pin CO_1 coupled to the master device control output pin MCO is correspondingly changed, the first slave device 120_1 updates a first slave device identification number of the first slave device 120_1 according to the identification number. Therefore, according to the identification number numbering method of the present embodiment, slave device identification numbers may be effectively and automatically numbered.

However, related device details and implementation modes about the multipoint communication system 100 of the present embodiment may refer to descriptions about the embodiments shown in FIG. 1 to FIG. 4 to obtain enough teachings, suggestions and implementation descriptions, and thus elaborations are omitted herein.

Figure 6:
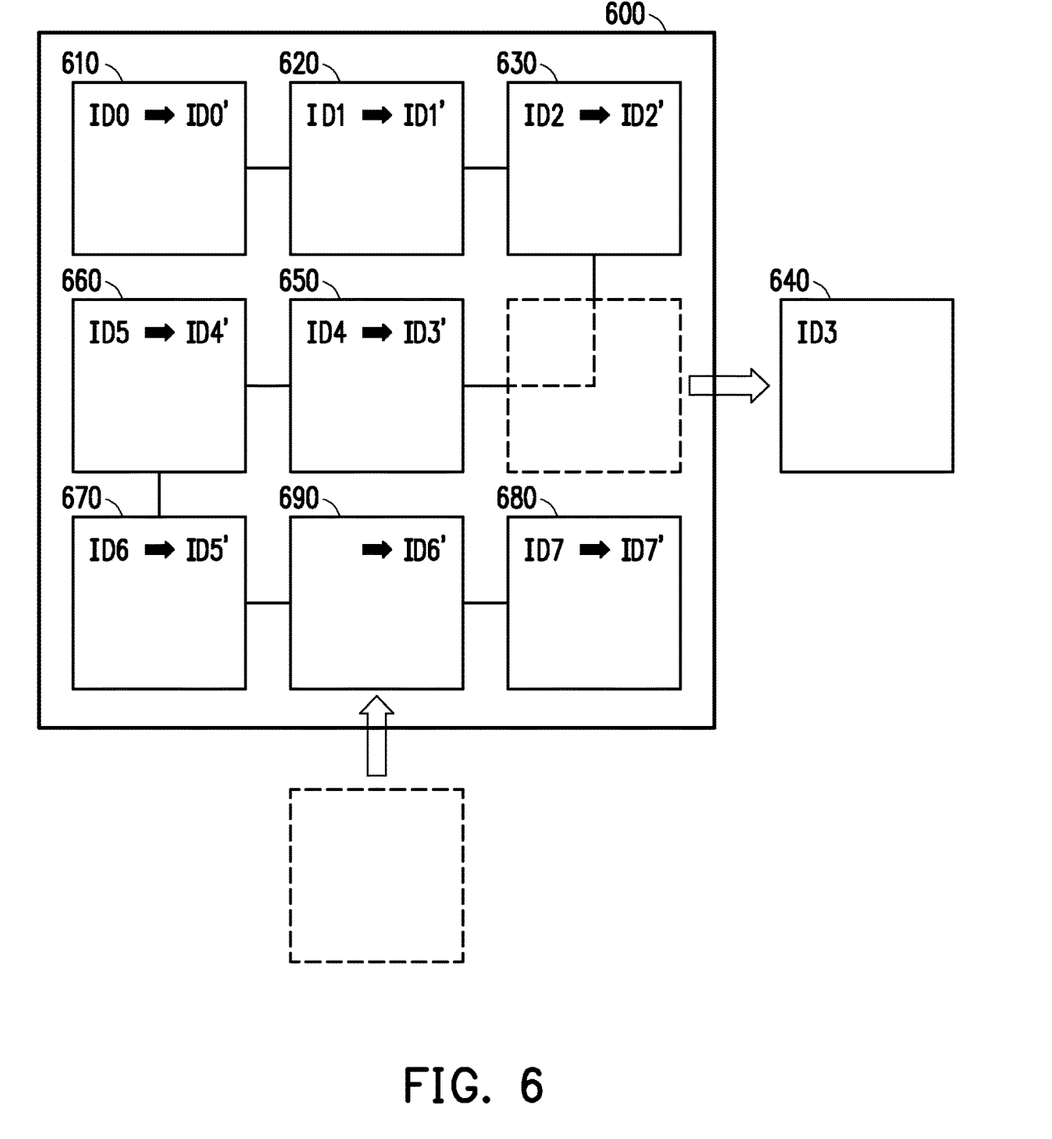
FIG. 6 is a schematic diagram of a display module according to an embodiment of the present invention.

FIG. 6 is a schematic diagram of a display module according to an embodiment of the present invention. Referring to FIG. 6, the display module 600 may adopt a multipoint communication system architecture of each aforementioned embodiment. A display array may originally consist of display panels 610-680, and the display panels 610-680 are coupled in series via a multipoint communication bus. In the present embodiment, the display panel 610 may serve as a master device, and the display panels 620-690 may serve as slave devices. A control output pin of the display panel 610 is coupled to a control input pin of the display panel 620, a control output pin of the display panel 620 is coupled to a control input pin of the display panel 630, and so on. A pin coupling manner for the display panels 610-680 may be the same as that for the multipoint communication system architecture of each aforementioned embodiment.

In the present embodiment, the display panels 610-680 may originally sequentially have device identification numbers "ID0"-"ID7" respectively. However, when the display panel 640 is damaged or removed by a user for another reasons and the user is intended to add the display panel 690 to the display module 600, the display module 600 may re-execute the identification number numbering method of each aforementioned embodiment for a re-numbering operation. It is to be noted that, a control output pin of the display panel 630 of the reconfigured display module 600 may be coupled to a control input pin of the display panel 650. Moreover, a control output pin of the display panel 670 may be coupled to a control input pin of the display panel 690. A control output pin of the display panel 690 may be coupled to a control input pin of the display panel 680.

For example, operations of the display panel 610 serving as the master device will be described in combination with the flow of the embodiment in FIG. 2. The display panel 610 may redefine the device identification number "ID0" as "ID0" of the display panel 610 (the identification number is not changed). In step S210, the display panel 610 sends an identification number packet to the multipoint communication bus. In step S220, the display panel 610 changes a voltage level of the control output pin to trigger the display panels 620, 630 and 650-690 for automatic identification number updating. In step S230, the display panel 610 determines whether a confirmation packet is received in a preset time interval. If YES, it is indicated that identification number updating of the display panels 620, 630 and 650-690 has yet not been ended. On the contrary, if NO, it is indicated that identification number updating of the display panels 620, 630 and 650-690 has been ended. Therefore, in step S240, the display panel 610 sends a coding stopping packet to the multipoint communication bus. In step S250, the display panel 610 resets the voltage level of the control output pin.

Then, operations of the display panels 620, 630 and 650-690 serving as the slave devices will be described in combination with the flow of the embodiment in FIG. 3. The display panels 620, 630 and 650-690 may execute the flow of the embodiment in FIG. 3 at the same time. For example, for the display panel 650, in step S310, the display panel 650 determines whether the identification number packet is received via the multipoint communication bus. If NO, the display panel 650 executes the step S330. On the contrary, if YES, the display panel 650 executes step S320. In step S320, the display panel 650 temporarily stores an identification number according to the identification number packet. In step S330, the display panel 650 determines whether a voltage level of the control input pin is changed. If NO, it is indicated that identification number updating of the previous display panel 630 has yet not been completed, and thus the display panel 650 re-executes the step S310. On the contrary, if YES, it is indicated that identification number updating of the previous display panel 630 has been completed, and a voltage level of the control output pin of the display panel 630 is changed to correspondingly change the voltage level of the control input pin of the display panel 650. Therefore, the display panel 650 executes step S340.

In step S340, the display panel 650 updates the original identification number ID4 to identification number "ID3" (the identification number is changed) according to the temporarily stored identification number. In step S350, the display panel 650 sends a next identification number packet (i.e., a confirmation packet) to the multipoint communication bus. In step S360, the display panel 650 changes a voltage level of the control output pin to trigger the next display panel 660 to continue executing identification number updating. In step S370, the display panel 650 determines whether the coding stopping packet is received. If NO, the display panel 650 executes the step S370 to keep monitoring. On the contrary, if YES, the display panel 650 resets the voltage level of the control output pin to end the identification number updating operation. In such case, after all the display panels 620, 630 and 650-690 complete identification number updating according to the aforementioned flow respectively, the updated identification numbers of the display panels 610, 620, 630 and 650-690 may sequentially be "ID0"-"ID7".

Therefore, in regardless of the original identification numbers or no matter whether a reconfigured device layout result is greatly different from original layout, the display module 600 of the present embodiment may adopt the multipoint communication system architecture and identification number numbering method of the present invention to effectively and automatically number the slave device identification numbers to rapidly complete identification number updating. Moreover, since the display panels 610, 620, 630 and 650-690 of which the identification numbers are updated may have new identification numbers that are sequentially arranged, driving of a back-end driving circuit or respective display picture layout design of a back-end operating system may be facilitated.

Based on the above, the identification number numbering method and multipoint communication system of the present invention may be applied to the condition that any one of multiple devices may be selected as a master device and the multiple devices are connected in series via a multipoint communication bus. In such case, in the present invention, the master device may send an identification number packet to the multipoint communication bus, and a voltage level of a master device control output pin is changed to trigger the first slave device, such that the first slave device receiving the identification number packet sent by the master device may automatically update a first slave device identification number. By parity of reasoning, in the present invention, the first slave device may send a next identification number packet to the multipoint communication bus, and a voltage level of a first control output pin is changed to trigger the second slave device. Therefore, by the identification number numbering method and multipoint communication system of the present invention, the multiple devices coupled to the multipoint communication bus may effectively and automatically number the identification numbers.

The present invention has been disclosed above with the embodiments but is not limited thereto. Those of ordinary knowledge in the art may make some modifications and embellishments without departing from the spirit and scope of the present invention. Therefore, the scope of protection of the present invention should be defined by the appended claims.

What is claimed is:

1. An identification number numbering method for a multipoint communication system, comprising:
   sending an identification number packet by a master device to a multipoint communication bus;
   receiving the identification number packet via the multipoint communication bus by a first slave device, and temporarily storing an identification number by the first slave device according to the identification number packet;
   changing a voltage level of a master device control output pin of the master device;
   when the first slave device determines that a voltage level of a first control input pin coupled to the master device control output pin is correspondingly changed, updating a first slave device identification number of the first slave device by the first slave device according to the another identification number that is temporarily stored
   after the first slave device updates the first slave device identification number, initiatively sending a first confirmation packet to the multipoint communication bus and a second slave device by the first slave device; and
   changing a voltage level of a first control output pin of the first slave device, wherein the first confirmation packet is another identification number packet, and the identification number numbering method further comprises:
   receiving the another identification number packet by the second slave device, and temporarily storing another identification number by the second slave device according to the another identification number packet, the another identification number being a next number following the identification number; and
   when the second slave device determines that a voltage level of a second control input pin coupled to the first control output pin is correspondingly changed, reading the another temporarily stored identification number by the second slave device, and updating a second slave device identification number of the second slave device by the second slave device according to the another identification number that is temporarily stored.

2. The identification number numbering method according to claim 1, further comprising:
   after the master device receives the first confirmation packet via the multipoint communication bus, determining whether a second confirmation packet is received in a preset time interval by the master device, and when the master device does not receive any second confirmation packet in the preset time interval, sending a coding stopping packet to the multipoint communication bus by the master device, and resetting the voltage level of the master device control output pin by the master device.

3. The identification number numbering method according to claim 2, further comprising:
   after the first slave device receives the coding stopping packet via the multipoint communication bus, resetting the voltage level of the first control output pin by the first slave device.

4. A multipoint communication system, comprising:
   a master device, coupled to a multipoint communication bus, and comprising a master device control output pin; and
   a first slave device, coupled to the multipoint communication bus, and comprising a first control input pin, the master device control output pin of the master device is coupled to the first control input pin of the first slave device, wherein when the master device executes an identification number numbering operation, the master device changes a voltage level of the master device control output pin, such that when the first slave device determines that a voltage level of the first control input pin is correspondingly changed, the first slave device updates a first slave device identification number of the first slave device according to the another identification number that is temporarily stored, wherein after the first slave device updates the first slave device identification number of the first slave device, the first slave device initiatively sends a first confirmation packet to the multipoint communication bus and a second slave device and changes a voltage level of a first control output pin of the first slave device, a second slave device, coupled to the multipoint communication bus, and comprising a second control input pin, the first control output pin of the first slave device is coupled to the second control input pin of the second slave device, wherein the second slave device temporarily stores another identification number according to anther identification number packet, and the another identification number is a next number following the identification number, and when the second slave device determines that a voltage level of the second control input pin coupled to the first control output pin is correspondingly changed, the second slave device reads the temporarily stored another identification number, and updates a second slave device identification number of the second slave device according to the temporarily stored another identification number.

5. The multipoint communication system according to claim 4, wherein the master device determines whether a confirmation packet is received in a preset time interval, and when the master device does not receive the confirmation packet, the master device sends a coding stopping packet to the multipoint communication bus, and the master device resets the voltage level of the master device control output pin.

6. The multipoint communication system according to claim 5, wherein, after the first slave device receives the coding stopping packet via the multipoint communication bus, the first slave device resets the voltage level of the first control output pin.

* * * * *